з,686,240
Patented Aug. 22, 1972

3,686,240
PROCESS FOR PRODUCING CACAO BUTTER SUBSTITUTE FROM PALM OIL DESCRIBED AND CLAIMED THEREIN
Tsukasa Kawada, Susumu Suzuki, and Nobuya Matsui, Tokyo, Japan, assignors to Kao Soap Co., Ltd., Tokyo, Japan
Filed Nov. 24, 1969, Ser. No. 879,306
Claims priority, application Japan, Nov. 26, 1968, 43/86,534
Int. Cl. C11c *3/12*
U.S. Cl. 260—409                                        2 Claims

ABSTRACT OF THE DISCLOSURE

A process for preparing a cacao butter substitute in which palm oil is cooled to a first temperature to crystallize a high melting point fraction which is then filtered off. Then the remainder of the palm oil is cooled to a second temperature lower than the first temperature to crystallize a middle melting point fraction which is then filtered off. The middle melting point fraction is then hydrogenated under conditions which minimize the formation of trans-acids, whereby to obtain the cacao butter substitute from the middle melting point fraction.

BACKGROUND OF THE INVENTION

Field of the invention

This invention relates to a process for producing a cacao butter substitute from palm oil, and its purpose is to produce an oil having properties similar to those of cacao butter advantageously on an industrial scale.

Description of the prior art

Cacao butter is obtained from cacao beans and it is a stiff solid at room temperature, but it melts smoothly in the mouth. The range of its melting point is narrow and it shows specific shrinking properties on cooling to solidify. It has a long storage life and it is widely used in confectionary applications, particularly as the fat for chocolate. Disadvantageously, because the growing areas and the amount of cacao beans grown are limited, the cost thereof is high and they are difficult to obtain on an industrial scale on a regular basis.

In view of these circumstances, there have been proposed many processes for producing cacao butter substitutes commercially. It has been already known to produce an oil similar to cacao butter by solvent fractionation of palm oil, but in any conventional process for this purpose, the yield of the said substitute is so low, based on the starting palm oil, that it cannot be said to be an economically satisfactory process.

In producing a cacao butter substitute by solvent fractionation of palm oil, the part which can be used as a cacao butter substitute is the middle melting point part or fraction. The other parts or fractions of high and low melting points, respectively, can be utilized as extremely hardened oil and liquid oil, respectively. However, the latter fractions have only low commercial value because there are other competing products produced from inexpensive raw materials. Therefore, it is important commercially to increase the yield of the middle melting point part or fraction which is suitable for use as a cacao butter substitute. Further, in addition to increasing the yield, it is also important to maintain the other necessary properties of the product as a cacao butter substitute; that is, the product should be solid at room temperature but it should rapidly melt near or at body temperature and, on blending with natural cacao butter, its melting point should not be lowered and it should not soften.

We have discovered a process for producing a cacao butter substitute of a good quality which can satisfy these requirements of a cacao butter substitute described above, and which can be obtained at a much higher yield than in any conventional process.

SUMMARY OF THE INVENTION

The present invention provides a process for producing a cacao butter substitute from palm oil, in which the palm oil is dissolved in nitropropane, acetone or mixtures thereof as a solvent. After crystallizing and filtering off a high melting point fraction mainly consisting of trisaturated glycerides by utilizing the difference of solubility, depending on temperature, of the various components of the palm oil, the filtrate is cooled and there is obtained by a second crystallization and filtration a middle melting point fraction having an iodine value of 38 to 47 and a melting point of 27 to 31° C. at a yield of 35 to 45 percent by weight based on the weight of the starting palm oil. Then the middle melting point fraction thus obtained is hydrogenated until the melting point of said fraction comes within the range of 33 to 38° C. and so that the amount of trans-acid formed is less than 5 percent by weight of said fraction.

The present invention is distinctive in that a middle melting point glyceride fraction having an iodine value and a melting point in the above specified ranges is removed from the palm oil at a high yield by solvent fractionation, using a specific solvent as described above, and then the fraction is hydrogenated so that it has properties in the above-described specific ranges.

As the solvent, acetone or nitropropane should be used, and mixtures thereof can produce a similarly good result. The middle melting point glyceride fraction having 38–47 iodine value and 27–31° C. melting point can be obtained at a yield of about 35–45 percent by weight, based on the weight of the starting palm oil, by using the above-described particular solvent. This middle melting point fraction will then be hydrogenated. As the hydrogenation catalyst, any commercially available catalyst for hydrogenation may be selected. Hydrogenation of the middle melting point fraction should be performed under such conditions that the formation of trans-acid during the hydrogenation is minimized. The amount of trans-acid which will be produced by the hydrogenation is preferably maintained as small as possible, and it is necessary to keep the amount of the trans-acid less than 5 percent by weight. A trans-acid content higher than 5 percent by weight will cause remarkable changes when the cacao butter substitute is mixed with natural cacao butter and the desirable taste and feel will be reduced. In order to control the formation of trans-acid so that less than 5 percent is formed in carrying out the process of the present invention, the hydrogenation should be performed under atmospheric pressure or under an elevated pressure in the presence of a copper-chromium-manganese oxide catalyst. The hydrogenation can be carried out most preferably by using the above-mentioned catalyst at a temperature of 180–200° C. under atmospheric pressure. Said copper-chromium-manganese oxide catalyst contains copper as the main component and consists of CuO and $CuCr_2O_4$ combined with a small amount of manganese oxide and is known in the art as the excellent catalyst for the selective hydrogenation of unsaturated fatty oils. The hydrogenation should be continued until the melting point of the hydrogenated product falls within the range of from 33 to 38° C. In this manner, a cacao butter substitute having satisfactory qualities can be manufactured at a high yield of about 35–45 percent by weight based on the weight of the starting palm oil.

The raw material palm oil contains about 35 percent by weight of mono-oleo-di-saturated glyceride (which will be abbreviated as S₂O hereinafter) which is a desirable component in a cacao butter substitute (G. Jurrian et al., J. Lipid Research, 5:366, 1964). However, it is almost impossible to remove S₂O completely out of palm oil by fractionation with a solvent other than acetone, nitropropane or mixtures thereof because of the mutual solubilities among the glycerides and the solubilities to the solvent, etc. Further, the conventionally known process of solvent fractionation of hardened palm oil will increase the kinds of glycerides present due to the formation of trans-acids on hydrogenation and it will reduce the selectivity of the fractionation. That is, the cacao butter substitute fraction will contain excessively large amounts of undesirable glycerides in the cacao butter (S₂E) and di-elaido-mono-saturated glyceride (S₂E); (E means elaidic acid, that is, trans-olein).

According to the process of the present invention, palm oil is dissolved in a solvent consisting of acetone and/or nitropropane, usually at a ratio of 1 g. of palm oil per 3 to 10 cc. of the solvent, and after crystallizing and filtering off the high melting point fraction mainly consisting of tri-saturated glycerides (S₃), the middle melting point fraction mainly consisting of mono-oleo-di-saturated glyceride (S₂O), mono-linoleo-di-saturated glyceride (S₂L) and the like is crystallized and removed by filtration. Then the said middle melting point fraction is hydrogenated under appropriate conditions for suppressing the formation of trans-acids, whereby to produce the cacao butter substitute. The fractionation temperature of the high melting point fraction is in the range of 16 to 25° C. and the fractionation temperature of the middle melting point fraction is in the range of 0 to 9° C.

According to this process, because hydrogenation is performed in the final step, it is advantageous in that the melting point of the substitute can be relatively easily controlled.

DESCRIPTION OF THE PREFERRED EMBODIMENTS

The invention will be explained hereinbelow with reference to illustrative examples. It will be understood that the present invention is not restricted to the details of the following examples.

Example 1

A comparison between the cacao butter substitute produced by the process of the present invention and the cacao butter substitute produced by a conventional process comprising solvent fractionation after hydrogenation of palm oil.

Example 1-1.—According to the present invention

Deacidified and decolorized palm oil having an iodine value of 52.0 and an acid value of 0.3 was dissolved in 2-nitropropane at a ratio of 1 g. of palm oil per 5 cc. of nitropropane. After removing the high melting point fraction precipitated at 18° C., the filtrate was cooled to 3° C. and the precipitated middle melting point fraction was removed by filtration. Table 1 shows the yield and properties of each fraction.

TABLE 1

| Fraction | Fractionation temp., °C. | Yield, percent | Iodine value | Melting point, °C. |
|---|---|---|---|---|
| 1. High melting point fraction | 18 | 10.6 | 10.2 | |
| 2. Middle melting point fraction | 3 | 42.5 | 45.5 | 28.9 |
| 3. Low melting point fraction | (¹) | 46.9 | 66.5 | |

¹ Residue.

Then, the obtained middle melting point fraction was hydrogenated until it had iodine value of 36.7 and melting point of 36° C. (with a trans-acid content of 2.7 percent by weight) by blowing in hydrogen by using a commercially available copper-chromium-manganese oxide catalyst. A useful cacao butter substitute was thus obtained.

Example 1-2.—Wherein palm oil was fractionated after hydrogenation

Palm oil identical with the raw material palm oil used in the above Example 1-1 was first hydrogenated until it had iodine value of 43.0 and a trans-acid content of 4.6 percent, using a commercially available copper-chromium-manganese oxide catalyst. The hardened palm oil was dissolved in 5 parts by volume 2-nitropropane per 1 part by volume of palm oil. The solution was fractionated to obtain the respective fractions as listed in Table 2. The obtained middle melting point fraction was the cacao butter substitute.

TABLE 2

| Fraction | Fractionation temp., °C. | Yield, percent | Iodine value | Trans-acid content, percent | Melting point °C |
|---|---|---|---|---|---|
| 1. High melting point fraction | 18 | 14.1 | 17.8 | 5.5 | |
| 2. Middle melting point fraction | 3 | 33.8 | 36.5 | 4.0 | 34 |
| 3. Low melting point fraction | (¹) | 52.0 | 59.2 | 4.0 | |

¹ Residue.

Figure 2:
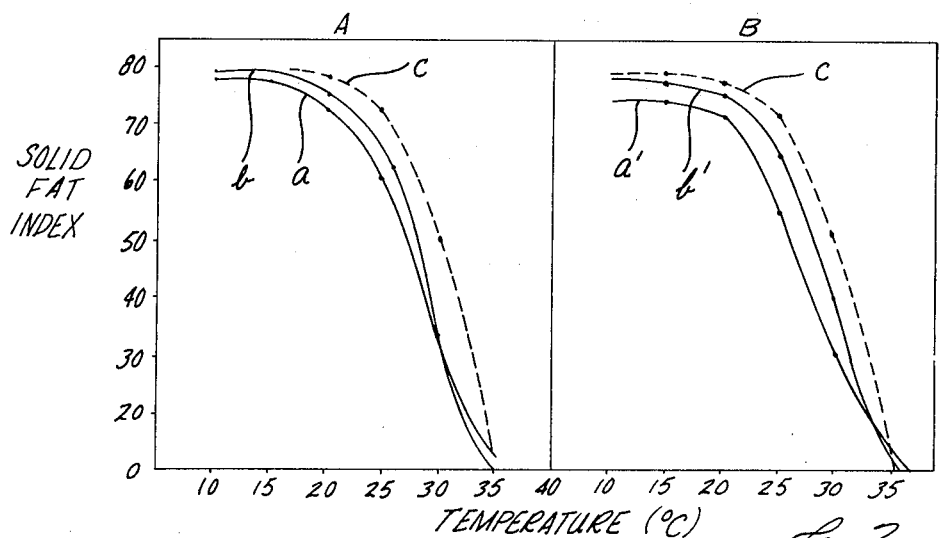
Figure 1:
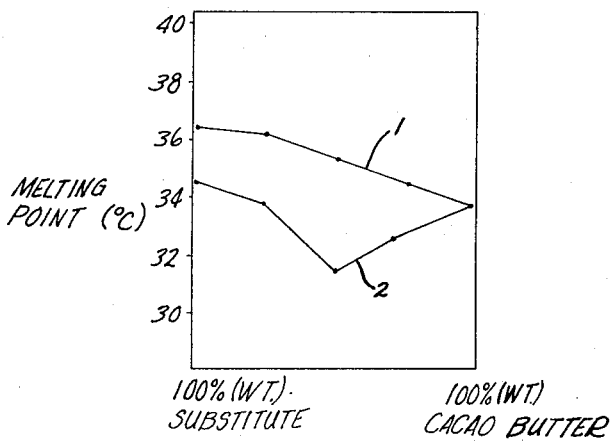

The samples of the cacao butter substitutes prepared in Examples 1-1 and 1-2 described above were blended with natural cacao butter in various blending ratios, and the changes resulting from blending were investigated by determining the changes in melting point and solid fat index. FIG. 1 and FIG. 2 show the changes of melting point and of solid fat index, respectively, for various blending ratios.

The melting point was represented by the softening point determined after filling a capillary tube of 1 mm. inner diameter with the respective sample, allowing the sample to stand at 5° C. overnight to solidify and then aging the sample at 25° C. for 3 days.

The solid fat index (SFI) was determined according to the method of American Oil Chemists' Society (A.O.C.S.: Official Tentative Method Cd. 10-57): after once completely solidifying the sample in an ice-water bath, it was aged at 30° C. for 3 days and the value was determined.

FIG. 1, the Curve 1 shows the results obtained using samples prepared by the present invention as described in the above 1-1; the curve 2 shows the results obtained using samples prepared by the conventional known process as described in the above 1-2. As clearly seen in these figures, when the cacao butter substitute is prepared by fractionating the hardened palm oil according to the conventional known process in the above 1-2, the melting point is reduced as a result of an increase in the blended amount of the nautral cacao butter, and the lowest melting point occurs near the blending weight ratio of 1:1. On the other hand, the cacao butter substitute obtained by the process of the present invention does not show such reduction of the melting point on blending with natural cacao butter as was seen in the former case.

FIG. 2 shows the relations of the solid fat index (SFI) to the temperature of each of the above two cacao butter substitutes when measured alone and when mixed with natural cacao butter in the weight ratio of 1:1. Section A of FIG. 2 shows the results obtained using the sample according to the conventional known process of the above 1-2, and Section B of FIG. 2 shows the results obtained using the sample according to the present invention of the above 1-1. Graphs a and a' in FIG. 2 shows the results of each substitute alone, graphs c shows the results of the natural cacao butter alone, and graphs b and b' show the results of their mixture at a weight ratio of 1:1. As clearly seen by determining SFI at 30° C. in Section A and Section B of FIG. 2, the cacao butter substitute according to the present invention shows a much smaller drop of SFI as compared to natural cacao butter.

Example 2

The starting palm oil identical with that used in Example 1 was dissolved in 2-nitropropane at a ratio of 1 g. of palm oil per 6 cc. of nitropropane and the solution was fractionated to obtain the fractions shown in Table 3.

TABLE 3

| Fraction | Fractionation temp., ° C. | Yield, percent | Iodine value | Melting point, ° C. |
|---|---|---|---|---|
| 1. High melting point fraction | 18 | 8.6 | 5.0 | |
| 2. Middle melting point fraction | 0 | 45.4 | 43.6 | 28.9 |
| 3. Low melting point fraction | (¹) | 46.0 | 67.3 | |

¹ Residue.

Figure 3:
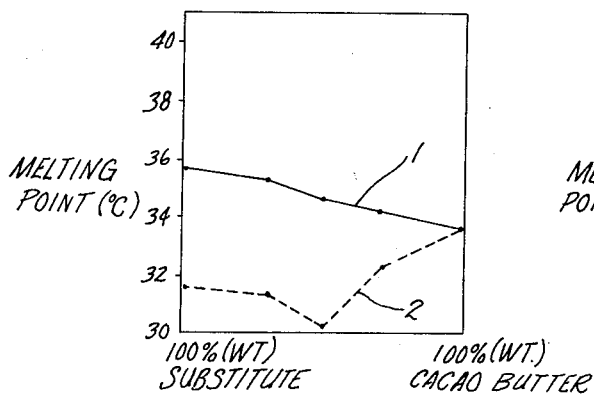
FIGS. 1 to 4 are graphs which compare the properties of cacao butter substitutes prepared according to the present invention and prepared according to a conventional method.

The middle melting point fraction of Table 3 was hydrogenated at 200° C. with a commercially available copper-chromium-manganese oxide catalyst to obtain a product having an iodine value of 35.9 and a trans-acid content of 1.0 percent. The melting point on blending the obtained sample with natural cacao butter is shown in FIG. 3 (Curve 1). In the same figure, the melting point on blending the cacao butter substitute prepared by fractionating a refined palm oil (which was not hydrogenated after the fractionation) with natural cacao butter is shown for the purpose of comparison (Curve 2). In this case, the melting point is lowest at a blending ratio near 1:1, and is below the melting point of natural cacao butter, while the sample prepared by the present invention does not show such a phenomenon.

Example 3

A starting palm oil identical with that used in Example 1 was dissolved in acetone with the ratio of 1 g. of palm oil per 6 cc. of acetone and the solution was fractionated into the fractions shown in Table 4.

TABLE 4

| Fraction | Fractionation temp., ° C. | Yield, percent | Iodine value | Melting point, ° C. |
|---|---|---|---|---|
| 1. High melting point fraction | 18 | 10.1 | 11.0 | |
| 2. Middle melting point fraction | 3 | 43.5 | 47.0 | 28 |
| 3. Low melting point fraction | (¹) | 46.4 | 64.5 | |

¹ Residue.

The middle melting point fraction was hydrogenated at 200° C. with a commercially available copper-chromium-manganese oxide catalyst to obtain a product having the iodine value of 39.0, a melting point of 36.5° C., and a trans-acid content of 4.0 percent. The melting point on blending the sample thus treated with natural cacao butter is shown in FIG. 4.

Figure 4:
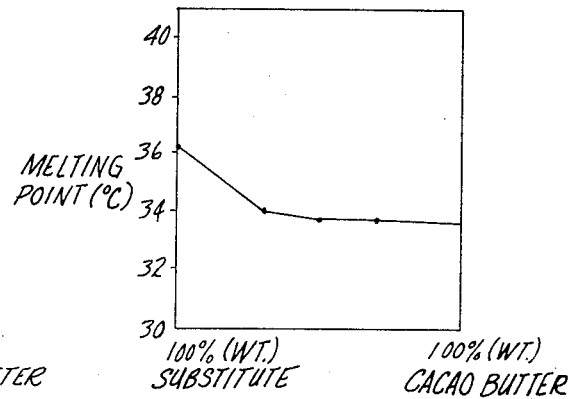

As seen in FIG. 4, the cacao butter substituted obtained by the process of the present invention does not show a reduction below the melting point of natural cacao butter on blending with natural cacao butter.

The embodiments of the invention in which an exclusive property or privilege is claimed are defined as follows:

1. A process for producing a cacao butter substitute from palm oil, which comprises dissolving palm oil in a solvent selected from the group consisting of nitropropane, acetone and mixtures thereof, cooling the solution to a first temperature in the range of about 16 to 25° C., crystallizing and filtering off the high melting point fraction mainly consisting of tri-saturated glyceride, cooling the filtrate to a second temperature in the range of about 0 to 9° C., crystallizing out the middle melting point fraction having an iodine value of 38 to 47 and a melting point of 27 to 31° C., and then hydrogenating said middle melting point fraction until the melting point of said middle melting point fraction becomes within the range of from 33 to 38° C. and so that the amount of trans-acids is less than 5 percent by weight in said middle melting point fraction, whereby to obtain a cacao butter substitute.

2. A process according to claim 1, in which the middle melting point fraction is hydrogenated by contacting said fraction with hydrogen in the presence of a copper-chromium-manganese catalyst at a temperature in the range of about 180–200° C.

References Cited

UNITED STATES PATENTS 3,105,844   10/1963   Toyama et al. _____ 260—409
2,942,984   6/1960    Wissebach _____ 260—409

LEWIS GOTTS, Primary Examiner

C. L. MILLS, Assistant Examiner

U.S. Cl. X.R.

99—118